US012031499B1

(12) United States Patent
Asame et al.

(10) Patent No.: US 12,031,499 B1
(45) Date of Patent: Jul. 9, 2024

(54) SEAL STRUCTURE AND MOUNTING METHOD OF BELT COVER FOR INTERNAL COMBUSTION ENGINE

(71) Applicant: HONDA MOTOR CO., LTD., Tokyo (JP)

(72) Inventors: Koichiro Asame, Tokyo (JP); Osamu Yoda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/557,636

(22) PCT Filed: Apr. 25, 2022

(86) PCT No.: PCT/JP2022/018685
§ 371 (c)(1),
(2) Date: Oct. 27, 2023

(87) PCT Pub. No.: WO2022/230797
PCT Pub. Date: Nov. 3, 2022

(30) Foreign Application Priority Data

Apr. 28, 2021 (JP) ................................ 2021-076729

(51) Int. Cl.
*F02B 77/00* (2006.01)
*F02B 67/06* (2006.01)
(Continued)

(52) U.S. Cl.
CPC ............ *F02F 11/002* (2013.01); *F02B 67/06* (2013.01); *F02B 75/22* (2013.01); *F16J 15/06* (2013.01)

(58) Field of Classification Search
CPC . F02B 67/06; F01L 1/022; F01L 1/024; F02F 2007/0078
(Continued)

(56) References Cited

U.S. PATENT DOCUMENTS 4,121,558 A * 10/1978 Sakakibara ............. F02B 75/20
123/193.5
10,731,601 B2 * 8/2020 Kashiwabara .......... F01L 1/344
(Continued)

FOREIGN PATENT DOCUMENTS

JP 61-179351 U 11/1986
JP H01-178726 A 7/1989
(Continued)

OTHER PUBLICATIONS

International Search Report issued in corresponding International Application No. PCT/JP2022/018685, dated Jul. 19, 2022, pp. 1-2, English Translation.
(Continued)

*Primary Examiner* — Long T Tran
*Assistant Examiner* — James J Kim
(74) *Attorney, Agent, or Firm* — Carter, DeLuca & Farrell LLP (57) ABSTRACT

Provided is a seal structure and a mounting method of a belt cover for an internal combustion engine, the belt cover ensuring good sealability, minimizing detachment and attachment of peripheral pipe and the like when the belt cover is detached and attached, and having excellent maintainability by allowing detachment and attachment of only a necessary cover member. The belt cover includes an inner cover member (3, CH) and an outer cover member on both sides of a timing belt TB, and the outer cover member is divided into upper and lower outer covers (7) and (8). Sealing in a cylinder bore row direction with respect to the upper outer cover is formed by a first seal member (31) accommodated in a mating surface of the inner cover member, and sealing in a cylinder axis direction with respect to the upper outer cover is formed by a second seal member (33) accommodated in a lower mating surface of the lower (Continued)

outer cover. A predetermined gap is formed between the inner cover member and another component (21), and a plurality of protrusions 34 and 34 for locking the upper outer cover are provided on the lower mating surface of the lower outer cover.

5 Claims, 7 Drawing Sheets

(51) Int. Cl.
*F02B 75/22* (2006.01)
*F02F 11/00* (2006.01)
*F16J 15/06* (2006.01)

(58) Field of Classification Search
USPC .................................................... 123/195 C
See application file for complete search history.

(56) References Cited

U.S. PATENT DOCUMENTS

2017/0292601 A1* 10/2017 Lee ...................... F16H 57/035
2019/0309668 A1* 10/2019 Suzuki .................... F01M 1/06
2020/0191100 A1*  6/2020 Koguchi ................. F01L 1/022

FOREIGN PATENT DOCUMENTS

JP        H05-079195 U    10/1993
WO    2019/039217 A1    2/2019

OTHER PUBLICATIONS

Notice of Reasons for Refusal issued by the Japanese Patent Office on Apr. 9, 2024 in corresponding JP Patent Application No. 2023-517500, with English translation.

* cited by examiner

SEAL STRUCTURE AND MOUNTING METHOD OF BELT COVER FOR INTERNAL COMBUSTION ENGINE

CROSS-REFERENCE TO RELATED APPLICATION (S)

This is a national stage application filed under 37 U.S.C. 371 based on International Patent Application No. PCT/JP2022/018685, filed Apr. 25, 2022, which claims priority to Japanese Patent Application No. 2021-076729 filed Apr. 28, 2021, the disclosures of which are incorporated herein by reference in their entireties.

TECHNICAL FIELD

The present invention relates to a seal structure and a mounting method of a belt cover for an internal combustion engine which enable accommodation of a timing belt, provided in the internal combustion engine, in a liquid-tight state.

BACKGROUND ART

One of internal combustion engines mounted on vehicles utilizes a timing belt (or a transmission band such as a timing chain) in order to transmit rotational power of a crankshaft in synchronization with a camshaft. Further, there is an internal combustion engine in which a belt cover that covers a timing belt is disposed in a cylinder block of an internal combustion engine in order to protect the timing belt from water and dust. The belt cover needs to be appropriately detached and attached from the cylinder block for inspection and replacement of the timing belt and the like. Therefore, the belt cover is required to have easiness of attachment and detachment in addition to sealability for waterproofness and dustproofness.

As a conventional belt cover in consideration of such a point, for example, a belt cover described in Patent Literature 1 is known. The belt cover is divided into an upper cover portion that covers a camshaft pulley and a lower cover portion on the lower side thereof. The lower cover portion is further divided into a left lower cover that covers a crankshaft pulley and the like and a right lower cover that covers pulleys of auxiliaries such as a water pump. Mating surfaces of the left and right lower covers have a labyrinth structure engaged in a cylinder bore row direction.

When the lower cover portion is attached to an internal combustion engine body, first, the left lower cover is screwed to a cylinder block from the cylinder bore row direction, and then, the right lower cover is screwed to the cylinder block from the same direction while causing the mating surface of the right lower cover to be engaged with the mating surface of the left lower cover. As a result, sealability between the left and right lower covers is ensured, and the right lower cover can be detached and attached independently from the left lower cover, so that maintenance of auxiliaries such as a water pump is performed, for example, in a state where only the right lower cover is removed.

CITATION LIST

Patent Literature

Patent Literature 1: JP S61-179351 U

SUMMARY OF INVENTION

Technical Problem

In recent years, there has been a great demand for reduction in weight and size of the internal combustion engine, and it is necessary to adopt a space-saving and waste-free layout, and thus, a pipe and the like are often laid close to the internal combustion engine body.

Therefore, when the belt cover is detached and attached for maintenance, the pipe and auxiliaries to which the pipe is connected become obstacles, and it is sometimes necessary to remove these.

For example, since the above-described conventional belt cover has the labyrinth structure in which the mating surfaces of the left and right lower covers are engaged in the cylinder bore row direction, the left lower cover needs to be moved in the cylinder bore row direction with respect to the right lower cover by at least an engagement length (meshing depth) of the mating surfaces when the left lower cover is removed. Therefore, in a case where the pipe and auxiliaries are disposed in the vicinity thereof and interfere, it is necessary to remove the pipe and auxiliaries so that maintainability is significantly deteriorated.

The present invention has been made to solve the above problems, and an object thereof is to provide a seal structure and a mounting method of a belt cover for an internal combustion engine, the belt cover ensuring good sealability, minimizing detachment and attachment of peripheral pipe and auxiliaries when the belt cover is detached and attached for maintenance, and having excellent maintainability by allowing easy detachment and attachment of only a necessary cover member.

Solution to Problem

In order to achieve this object, an invention according to claim 1 relates to a seal structure of a belt cover accommodating a timing belt TB in a liquid-tight state in an internal combustion engine 1, which includes the timing belt TB disposed on one end side in a cylinder bore row direction of an internal combustion engine body (a cylinder block CB and cylinder heads CH in an embodiment (hereinafter, the same applies to this section)) and drivingly couples a crankshaft 10 and camshafts 11 to 14 and a predetermined other component (a cooling water pipe 21) disposed on the one end side of the internal combustion engine body, the seal structure including: an inner cover member (a front inner cover 2, a rear inner cover 3, the cylinder head CH, and an oil pump case OP) disposed on a side of the internal combustion engine body with respect to the timing belt TB; and an outer cover member (a front outer cover 6, a rear outer cover 7, a side mount bracket 8, and a lower cover 9) that is disposed on an opposite side of the internal combustion engine body with respect to the timing belt TB and accommodates the timing belt TB in the liquid-tight state together with the inner cover member. The outer cover member is divided into at least an upper outer cover (the front outer cover 6 and the rear outer cover 7) and a lower outer cover (the side mount bracket 8) in a cylinder axis direction. The upper outer cover and the inner cover member have mating surfaces to be mated with each other in outer peripheral portions, respectively, and sealing in the cylinder bore row direction is formed by a first seal member (a first packing 31) accommodated in an accommodating groove formed in one of the mating surfaces. The upper outer cover and the lower outer cover have an upper mating surface and a lower mating surface to be mated with each other in a lower end portion and an upper end portion, respectively, and sealing in the cylinder axis direction is formed by a second seal member (a second packing 33) accommodated in an accommodating groove 32 formed in the lower mating surface. A predetermined gap through which the upper outer cover passes is formed between the inner cover member and the other component, and the lower mating surface of the lower outer cover is provided with a plurality of protrusions 34 and 34 spaced apart from each other to lock the upper outer cover inserted from above.

With this configuration, the timing belt is disposed on the one end side of the internal combustion engine body in the cylinder bore row direction. The belt cover accommodating the timing belt in the liquid-tight state includes the outer cover member on the opposite side of the inner cover member on the internal combustion engine body side, and the outer cover member is divided into at least the upper outer cover and the lower outer cover in the cylinder axis direction. The upper outer cover and the inner cover member are sealed in a packing manner in the cylinder bore row direction by the first seal member accommodated in the accommodating groove formed on one of the mating surfaces of the upper outer cover and the inner cover member. Further, the upper outer cover and the lower outer cover are sealed in a packing manner in the cylinder axis direction (up-down direction) by the second seal member accommodated in the accommodating groove formed in the lower mating surface of the lower outer cover.

As described above, the outer cover member of the belt cover that accommodates the timing belt is divided into the upper outer cover and the lower outer cover, and the sealing of the mating surfaces of the upper and lower outer covers is achieved in the packing manner in the up-down direction, and the sealing of the mating surfaces of the upper outer cover and the inner cover member is achieved in the packing manner in the cylinder bore row direction. This makes it possible to ensure good sealability between the upper and lower outer covers and between the upper outer cover and the inner cover member, and to easily insert and remove the upper outer cover in the up-down direction.

Further, since the predetermined gap is formed between the inner cover member and the other component, the upper outer cover does not interfere with the other component at the time of detachment and attachment, and removal of the other component becomes unnecessary. Furthermore, the upper outer cover is locked and positioned by the plurality of protrusions provided on the lower mating surface of the lower outer cover when the upper outer cover is inserted, and thus, the upper outer cover can be easily mounted. As described above, when the belt cover is detached and attached for maintenance, the upper outer cover can be easily detached and attached without removing the other component, and excellent maintainability can be obtained.

An invention according to claim 2 relates to the seal structure of the belt cover for the internal combustion engine according to claim 1, in which a guide portion 30 is formed on the mating surfaces between the upper outer cover and the inner cover member, the guide portion being inclined to approach the other component side from a position facing the other component as proceeding toward the lower mating surface side of the lower outer cover.

With this configuration, when the upper outer cover is inserted between the inner cover member and the other component, the lower end side of the upper outer cover is guided to approach the other component side by the inclined guide portion of the mating surface of the inner cover member, so that the upper outer cover can be stably and easily mounted even if the gap against the other component is narrow.

An invention according to claim 3 relates to the seal structure of the belt cover for the internal combustion engine according to claim 1, in which the predetermined other component includes a pipe (the cooling water pipe 21) through which a liquid for the internal combustion engine flows.

If it is necessary to remove the pipe at the time of removing the upper outer cover for maintenance in a case where the predetermined other component includes the pipe through which the liquid for an internal combustion engine, for example, cooling water or oil, flows, the liquid needs to be discharged from the pipe or auxiliaries related to the pipe before the removal, and such work becomes very complicated. As described above, since it is unnecessary to remove the other component at the time of removing the upper outer cover according to the present invention, it is possible to avoid the work of discharging the liquid from the pipe and the auxiliaries, and it is possible to significantly reduce man-hours and time of maintenance work.

An invention according to claim 4 relates to the seal structure of the belt cover for the internal combustion engine according to claim 1 or 2, in which the internal combustion engine 1 is a V-type engine including a plurality of banks (a front bank BF and a rear bank BR) having a plurality of cylinder bore rows, respectively, and the upper outer cover is divided into a plurality of upper outer covers (the front outer cover 6 and the rear outer cover 7) for the plurality of banks, respectively.

With this configuration, the internal combustion engine is the V-type engine including the plurality of banks, and the upper outer cover is divided into the plurality of upper outer covers for the plurality of banks, respectively. Therefore, in a case where maintenance of only one bank side is required, it is possible to cope with the case by removing only the upper outer cover of the bank, and thus, it is possible to reduce the man-hours and time of the maintenance work.

Further, in order to achieve the object, an invention according to claim 5 relates to a mounting method of a belt cover for an internal combustion engine for mounting the belt covers according to claims 1 to 4, the mounting method including: inserting the upper outer cover (the rear outer cover 7) between the other component (the cooling water pipe 21) and the inner cover member (the rear inner cover 3) from above and moving the upper outer cover downward along the mating surfaces; and mating the upper mating surface of the upper outer cover with the lower mating surface of the lower outer cover to compress the second seal member (the second packing 33) and fastening and fixing the upper outer cover to the internal combustion engine body in a state where the mating surface of the upper outer cover compresses the first seal member (the first packing 31).

With this configuration, in the belt cover according to claims 1 to 4, the upper outer cover can be easily mounted while ensuring good sealability with the lower outer cover and the inner cover member by the above mounting method, and thus, the above-described effects according to the inventions of claims 1 to 4 can be favorably obtained, for example, the man-hours and time of the maintenance work can be significantly reduced.

DESCRIPTION OF EMBODIMENTS

Hereinafter, a preferred embodiment of a belt cover of an internal combustion engine 1 of the present invention will be described in detail with reference to the drawings. Note that a case where the internal combustion engine 1 is vertically installed will be described as an example in the present embodiment. Further, a description will be given assuming that a direction in which a crankshaft 10 and camshafts 11, 12, 13, and 14 of the internal combustion engine 1 extend is an axial direction or a cylinder bore row direction, vertically upward and vertically downward directions are an up-down direction, and a front-rear direction of a vehicle when the internal combustion engine 1 is vertically installed on the vehicle is a front-rear direction.

Figure 1:
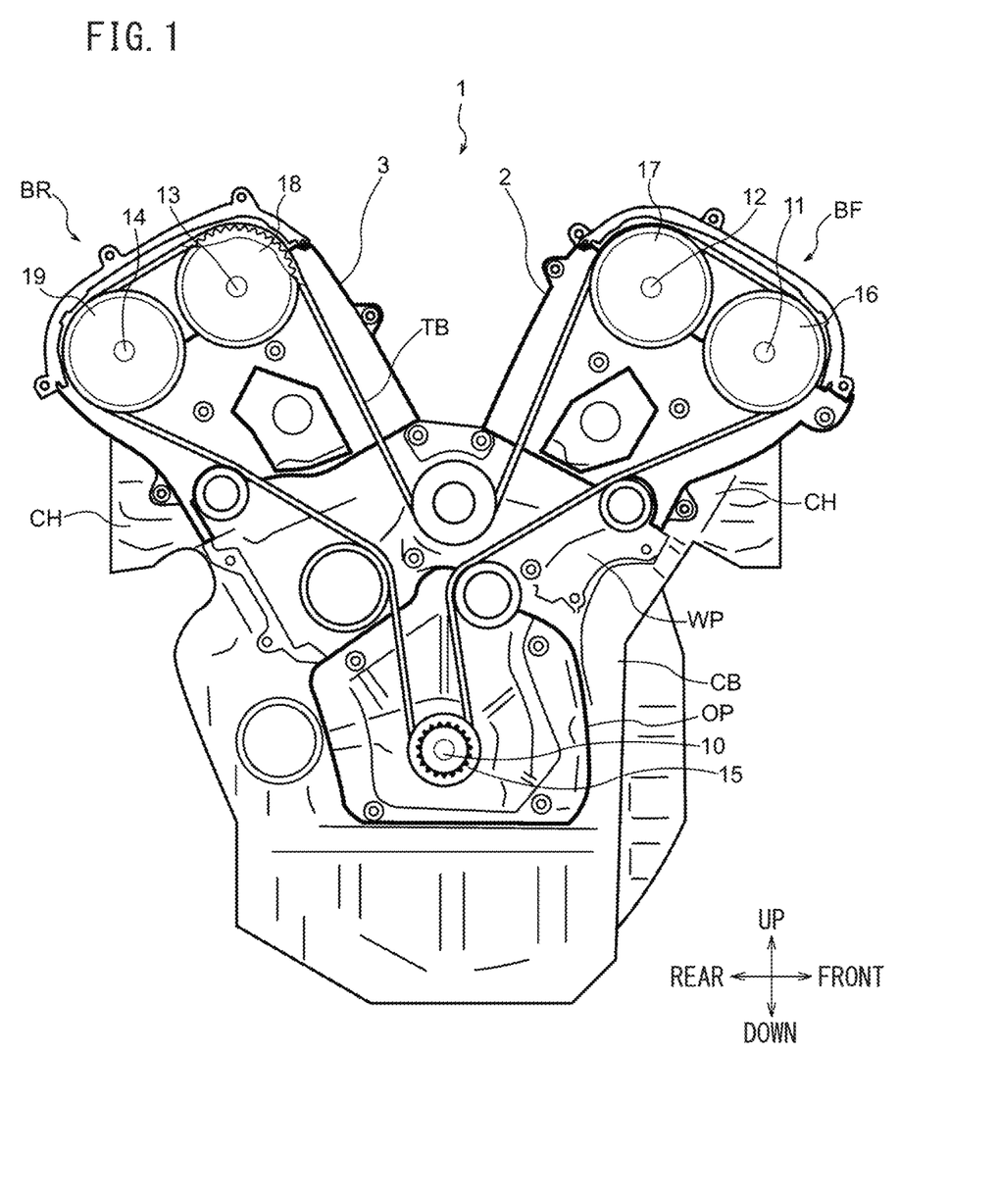
FIG. 1 is a view illustrating a timing belt in an internal combustion engine and a belt cover disposed on the inner side of the timing belt.
Figure 2:
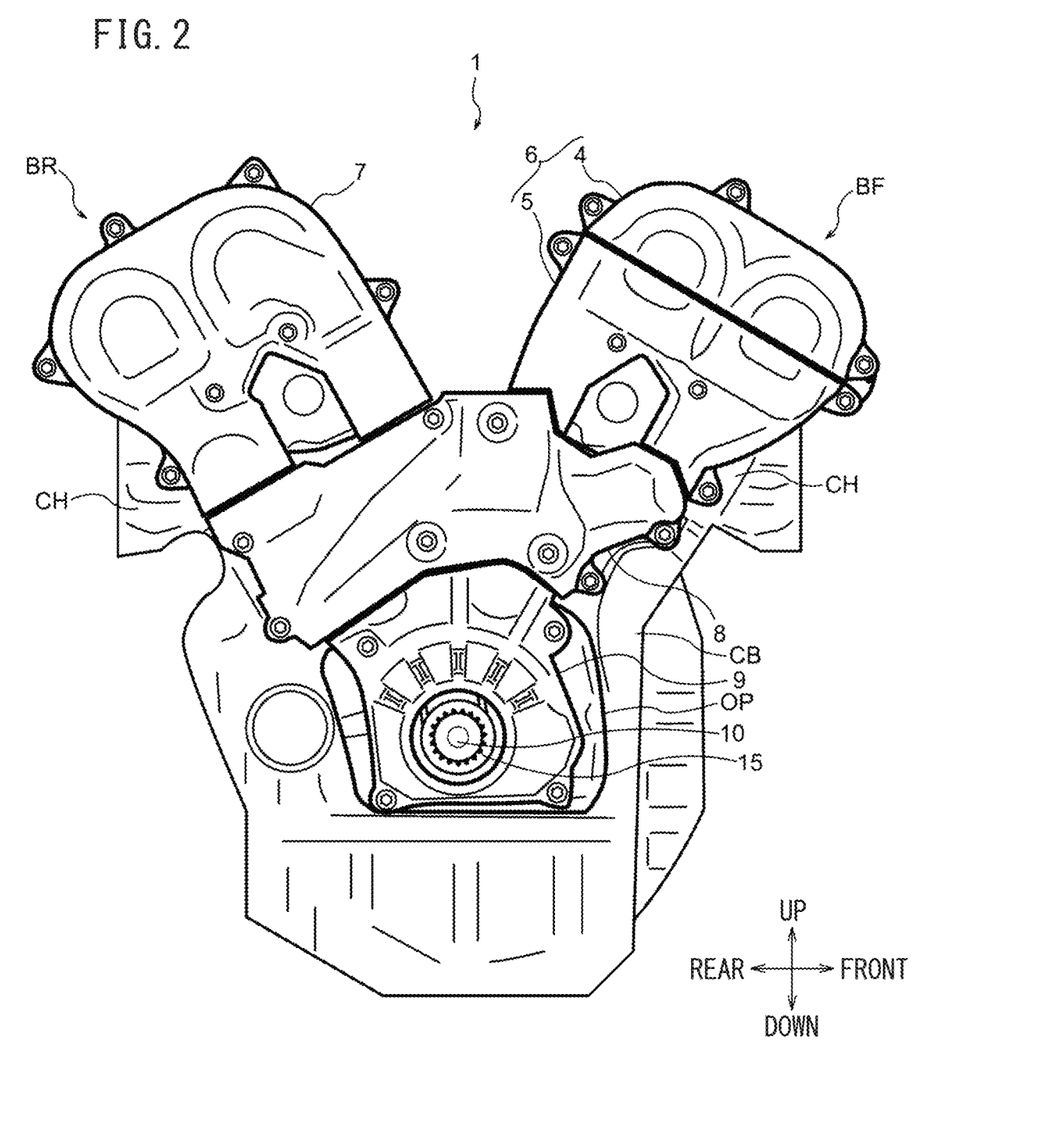
FIG. 2 is a view illustrating the belt cover disposed on the outer side of the timing belt in the internal combustion engine.

A structure of a timing belt TB of the internal combustion engine 1 and a structure of the belt cover of the internal combustion engine 1 will be schematically described with reference to FIGS. 1 and 2. FIG. 1 is a view illustrating the timing belt TB in the internal combustion engine 1 and the belt cover disposed on the inner side of the timing belt TB. FIG. 2 is a view illustrating the belt cover disposed on the outer side of the timing belt TB in the internal combustion engine 1. Note that the inner side and the outer side are defined here such that a side closer to cylinder heads CH and CH or a cylinder block CB of the internal combustion engine 1 with respect to the timing belt TB is the inner side, and the opposite side thereof is the outer side.

The internal combustion engine 1 is a DOHC V-type engine, and includes a front bank BF and a rear bank BR. Each of the banks BF and BR is provided with a cylinder bore row including a plurality of cylinders (not illustrated) arrayed in the axial direction (depth direction of the paper surface of FIG. 1). As illustrated in FIG. 1, the crankshaft 10, the camshafts 11 and 12, and the camshafts 13 and 14 are provided in the cylinder block CB, the cylinder head CH of the front bank BF, and the cylinder head CH of the rear bank BR, respectively, so as to protrude to one end side in the axial direction (cylinder bore row direction).

The crankshaft 10 and the camshafts 11, 12, 13, and 14 are coupled to drive pulleys 15, 16, 17, 18, and 19, respectively, to be integrated. The timing belt TB is stretched around the drive pulleys 15 to 19 and the other pulleys. As a result, the crankshaft 10 and the camshaft 11 to 14 rotate in conjunction and synchronization.

As illustrated in FIGS. 1 and 2, devices such as the timing belt TB and the drive pulleys 15 to 19 related thereto are protected by the belt cover. The belt cover of the present embodiment includes a front inner cover 2, a rear inner cover 3, an upper outer cover 4, a lower outer cover 5, a rear outer cover 7, a side mount bracket 8, and a lower cover 9.

An assembling procedure of the belt cover of the present embodiment will be schematically described with reference to FIGS. 1 and 2. First, as a premise, the front inner cover 2 and the rear inner cover 3 are assembled to the cylinder heads CH and CH before the timing belt TB is assembled to the internal combustion engine 1 as illustrated in FIG. 1. Further, an oil pump case OP is assembled to the cylinder block CB.

Next, the lower cover 9 is attached to the periphery of the crankshaft 10, and the side mount bracket 8 is attached to be adjacent above the lower cover 9 as illustrated in FIG. 2. Thereafter, the rear outer cover 7 covers the outer sides of the drive pulleys 18 and 19 of the camshafts 13 and 14, and is attached to be adjacent above the side mount bracket 8. Further, the lower outer cover 5 is attached to be adjacent above the side mount bracket 8, and the upper outer cover 4 is attached to be adjacent above the lower outer cover 5. Here, the upper outer cover 4 and the lower outer cover 5 are coupled to be integrated with each other, and constitute a front outer cover 6 that covers the outer sides of the drive pulleys 16 and 17 of the camshafts 11 and 12.

Figure 3:
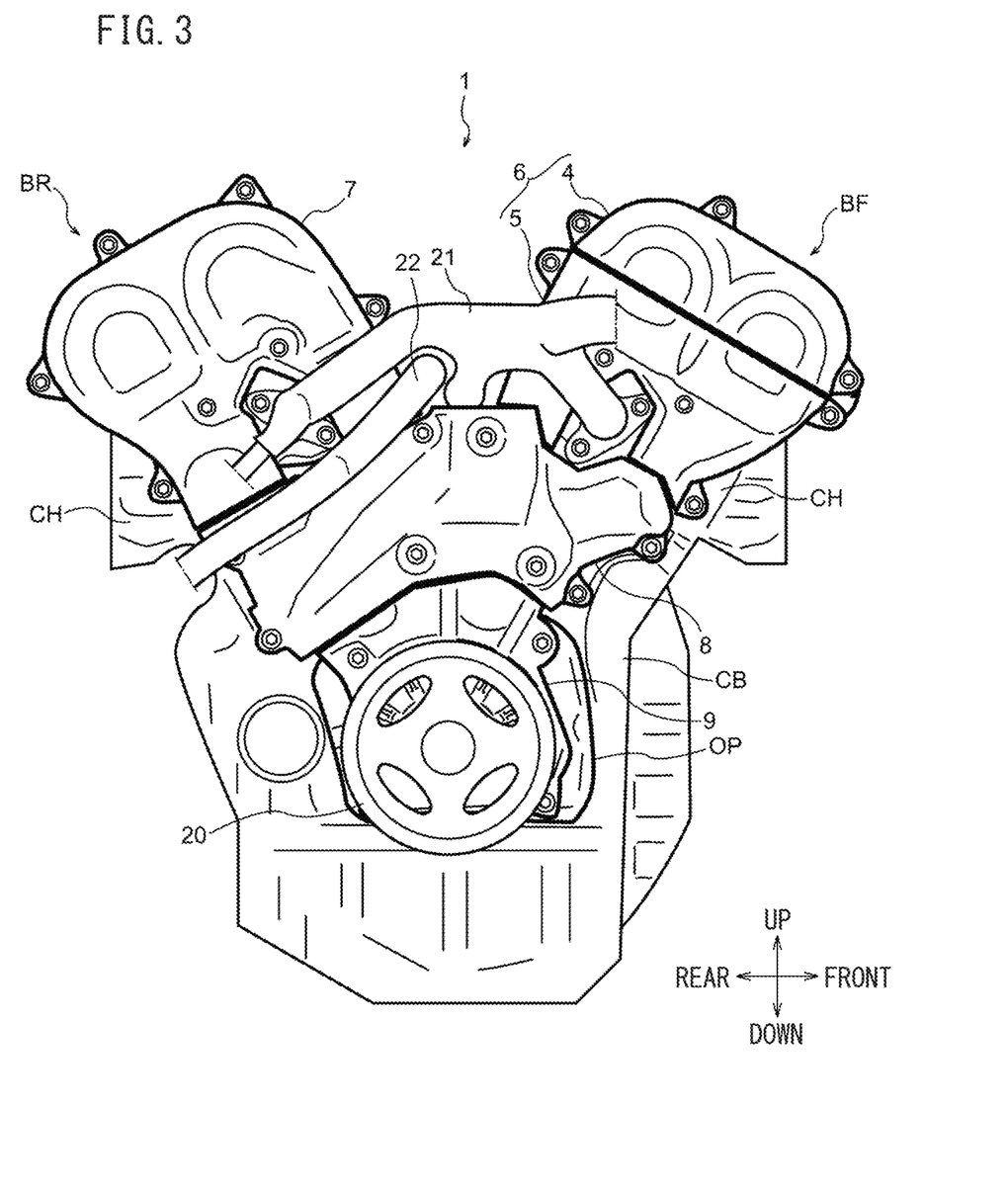
FIG. 3 is a side view of the internal combustion engine illustrating a state in which the belt cover is assembled.

FIG. 3 is a side view of the internal combustion engine 1 illustrating a state in which the belt cover is assembled. After the belt cover is assembled, a crank pulley 20 is connected to the crankshaft 10 as illustrated in FIG. 3. Further, a cooling water pipe 21 through which cooling water of the internal combustion engine 1 flows is disposed on the outer sides of the front outer cover 6 and the rear outer cover 7, and a cooling water pipe 22 is disposed on the outer side of the side mount bracket 8.

Figure 4:
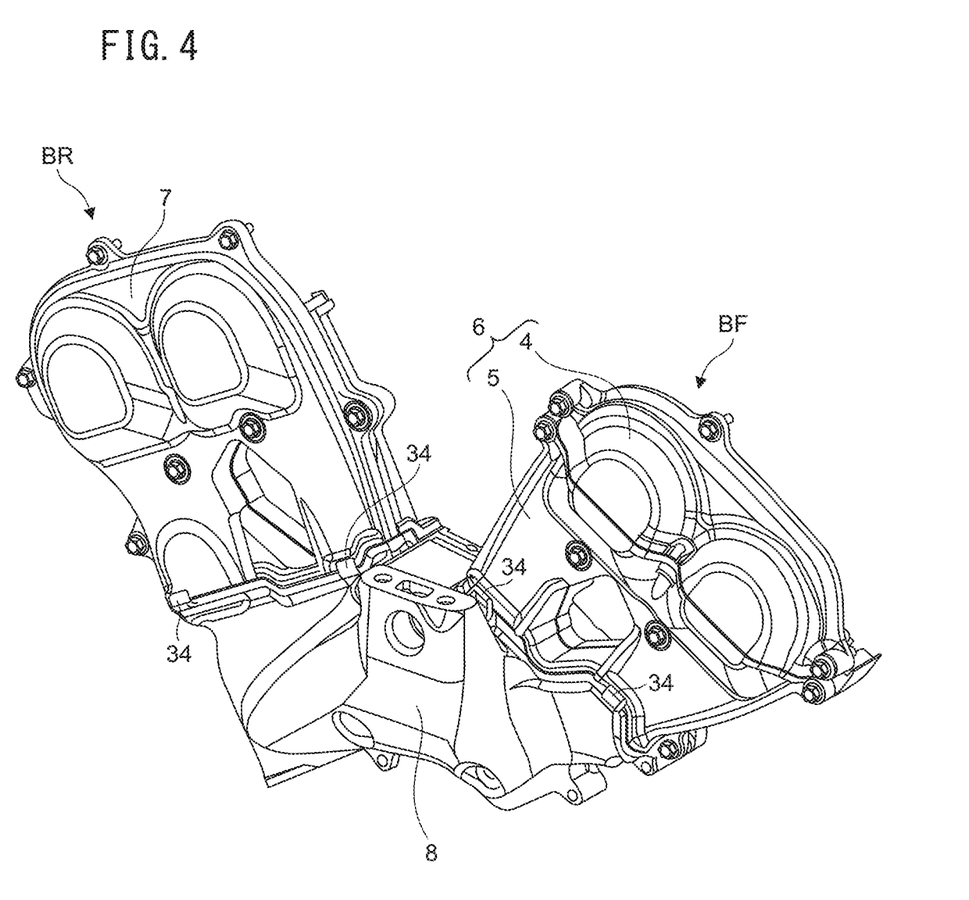
FIG. 4 is a perspective view illustrating a substantially upper half portion of the belt cover of FIG. 2.

Next, seal structures of the front outer cover 6 and the rear outer cover 7 according to the present invention will be described with reference to FIGS. 4 to 7. As illustrated in FIG. 4, the front outer cover 6 is sealed, via the lower outer cover 5, in the up-down direction (cylinder axis direction) with respect to the side mount bracket 8 and in the axial direction (cylinder bore row direction) with respect to the cylinder head CH (not illustrated). Similarly, the rear outer cover 7 is sealed in the up-down direction with respect to the side mount bracket 8, and is sealed in the axial direction with respect to the cylinder head CH (see FIG. 6). Since the seal structures of the front outer cover 6 and the rear outer cover 7 are basically the same, the seal structure of the latter 7 will be mainly described hereinafter.

Figure 6A:
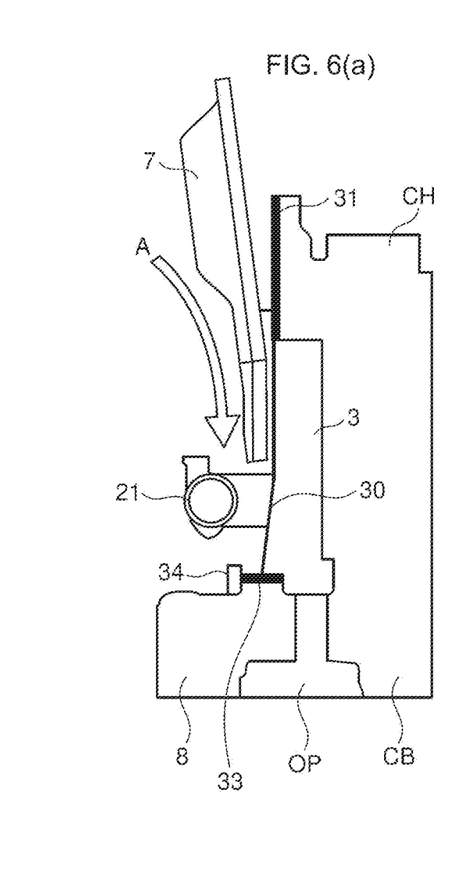
FIGS. 6(a)-6(c) are views for describing a situation when an upper outer cover is mounted.

As illustrated in FIG. 6(a), on the rear bank BR side, the oil pump case OP and the side mount bracket 8 are integrally provided in order on one side surface of the cylinder block CB, and the cylinder head CH is fixed to an upper surface of the cylinder block CB. A large recess is formed in a lower portion of a side surface of the cylinder head CH, and the rear inner cover 3 is fitted and fixed to the recess. The side surface of the cylinder head CH and an upper portion of a side surface of the rear inner cover 3 are substantially flush with each other and extend in the vertical direction. On the other hand, a lower portion of the side surface of the rear inner cover 3 is a guide portion 30 that is inclined so as to gradually approach the cooling water pipe 21 side as proceeding downward from a position facing the cooling water pipe 21. Further, a gap having a predetermined size is formed between the rear inner cover 3 and the cooling water pipe 21.

Figure 5:
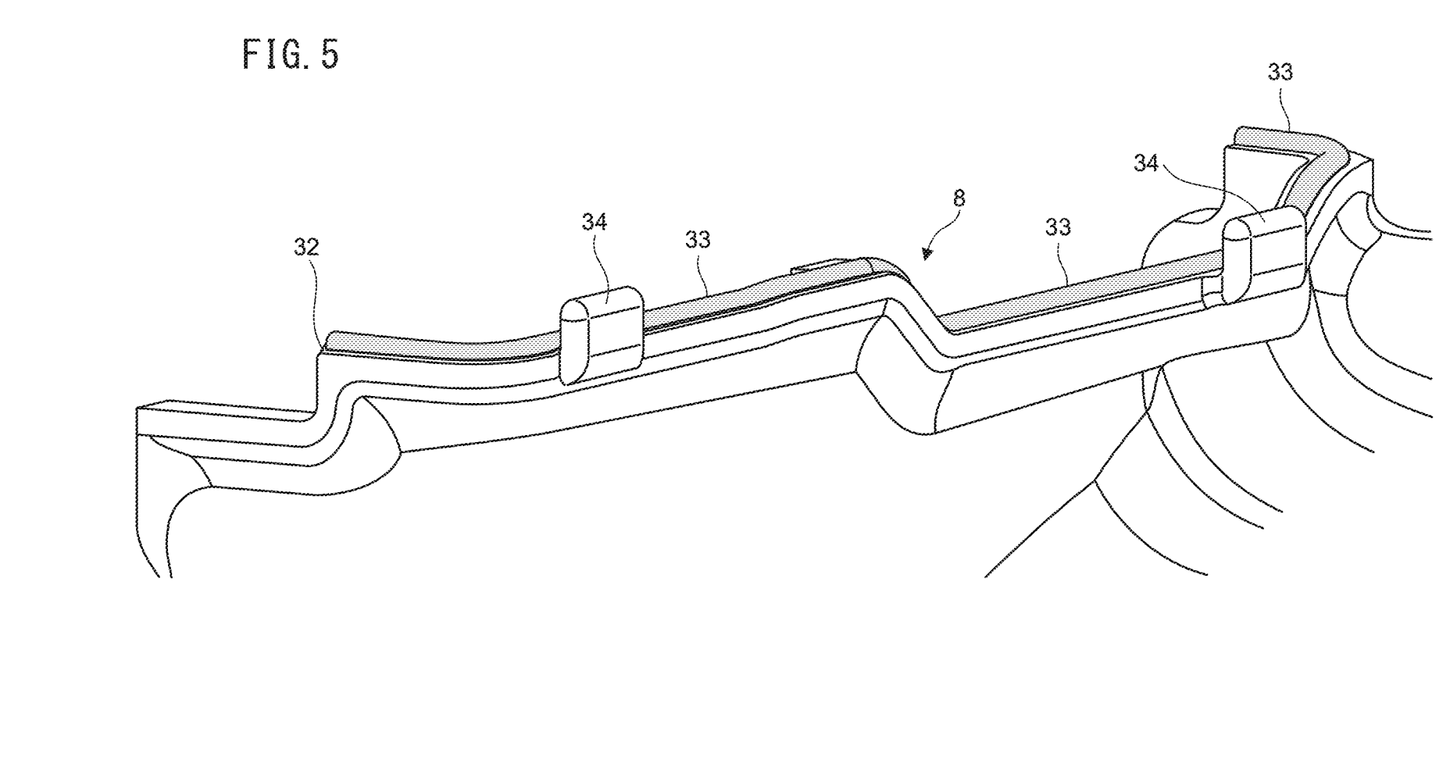
FIG. 5 is a partially enlarged perspective view illustrating a part of a lower mating surface of a side mount bracket of FIG. 4.

The side surface of the cylinder head CH forms a mating surface with the rear outer cover 7, and an accommodating groove (not illustrated) is formed in the up-down direction along the mating surface, and a first packing 31 made of rubber is accommodated in the accommodating groove. Further, a lower surface of the rear outer cover 7 and an upper surface of the side mount bracket 8 form an upper mating surface and a lower mating surface, respectively, which mated with each other. As illustrated in FIG. 5, an accommodating groove 32 is formed along the lower mating surface of the side mount bracket 8, and a second packing 33 made of rubber is accommodated in the accommodating groove 32. Further, on the lower mating surface, two protrusions 34 and 34 protruding upward from outer end portions of the lower mating surface in the width direction are provided at two predetermined positions separated from each other.

Next, a mounting method of the rear outer cover 7 to the above-described configuration will be described with reference to FIG. 6. First, as illustrated in FIG. 6(*a*), the rear outer cover 7 is slid downward along the side surface of the rear inner cover 3 in a state where the rear outer cover 7 is slightly inclined with respect to the vertical direction to insert a distal end portion thereof into the gap between the rear inner cover 3 and the cooling water pipe 21. Since the gap is set to the predetermined size as described above, the rear outer cover 7 is smoothly inserted without interfering with the cooling water pipe 21.

Figure 6B:
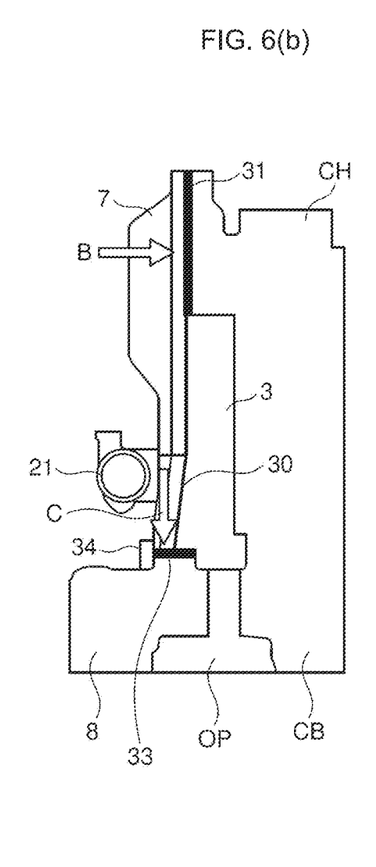
Figure 6C:
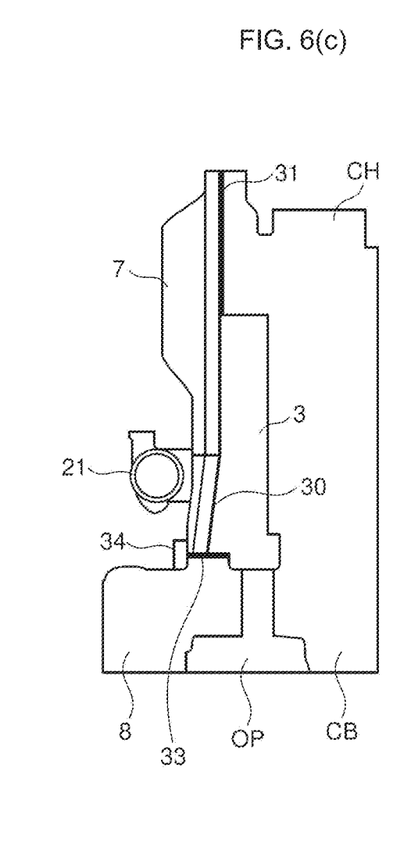

Thereafter, when the rear outer cover 7 is further moved downward, the rear outer cover 7 is guided along the inclined guide portion 30, thereby smoothly reaching the lower mating surface of the side mount bracket 8 while gradually changing its angle in the vertical direction as indicated by an arrow A in FIG. 6(*a*). In this state, as illustrated in FIG. 6(*b*), the rear outer cover 7 is pressed against the cylinder head CH side (an arrow B) to compress the first packing 31, and the rear outer cover 7 is pressed against the side mount bracket 8 side (an arrow C) to compress the second packing 33. As a result, the rear outer cover 7 is locked and positioned by the protrusions 34 and 34 of the lower mating surfaces as illustrated in FIG. 6(*c*). As described above, good sealability in the cylinder bore row direction by the first packing 31 is secured, and good sealability in the up-down direction by the second packing 33 is secured. Then, in this state, the rear outer cover 7 is fastened and fixed to the cylinder head CH with a bolt or the like, thereby completing mounting work.

Figure 7:
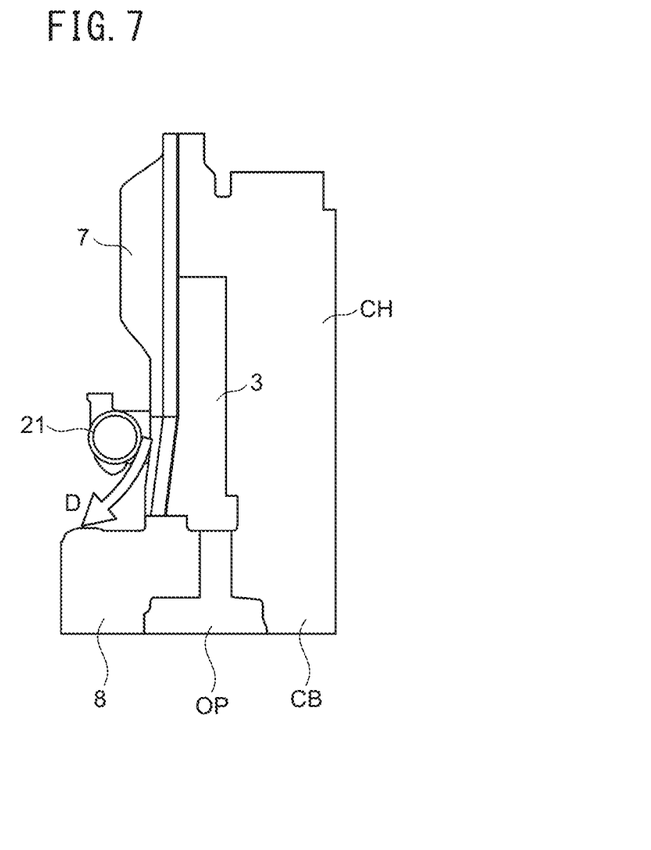
FIG. 7 is a view illustrating a situation when an upper outer cover is mounted in a comparative example with respect to FIG. 6.

On the other hand, in a case where the protrusion 34 is not provided on the lower mating surface of the side mount bracket 8 as illustrated in FIG. 7, if the rear outer cover 7 is inserted from above, the rear outer cover 7 is likely to slide outward as indicated by an arrow D when reaching the lower mating surface, and thus, cannot be stably positioned.

Note that the seal structure of the entire front outer cover 6 including the upper outer cover 4 and the lower outer cover 5 is basically similar to the seal structure of the rear outer cover 7 although not illustrated.

As described above, according to the present embodiment, the outer cover member of the belt cover accommodating the timing belt TB is divided into the front outer cover 6 or the rear outer cover 7, the side mount bracket 8, and the lower cover 9, and the sealing between the upper mating surface of the front or rear outer cover 6 or 7 and the lower mating surface of the side mount bracket 8 is obtained by the second packing 33 in the up-down direction, and the sealing between the mating surfaces of the front or rear outer cover 6 or 7 and the cylinder head CH is obtained by the first packing 31 in the cylinder bore row direction. As a result, it is possible to ensure good sealability between the front or rear outer cover 6 or 7 and the side mount bracket 8 and between the front or rear outer cover 6 or 7 and the cylinder head CH, and it is possible to easily insert and remove the front or rear outer cover 6 or 7 in the up-down direction.

Further, since the gap having the predetermined size is formed between the rear inner cover 3 and the cooling water pipe 21, the rear outer cover 7 does not interfere with the cooling water pipe 21 at the time of detachment and attachment, and removal of the cooling water pipe 21 and work of discharging the cooling water therefor become unnecessary. Furthermore, when the rear outer cover 7 is inserted between the rear inner cover 3 and the cooling water pipe 21, a lower end side of the rear outer cover 7 is guided to approach the cooling water pipe 21 by the inclined guide portion 30 of the mating surface of the rear inner cover 3, and thus, the rear outer cover 7 can be stably and easily mounted even if the gap against the cooling water pipe 21 is narrow.

Further, when the rear outer cover 7 is inserted, the rear outer cover 7 is locked and positioned by the protrusions 34 and 34 provided on the lower mating surface of the side mount bracket 8, and thus, the rear outer cover 7 can be easily mounted. As described above, when the belt cover is detached and attached for maintenance, the rear outer cover 7 can be easily detached and attached without removing the cooling water pipe 21, and as a result, excellent maintainability can be obtained, for example, man-hours and time of maintenance work can be significantly reduced.

Further, the internal combustion engine 1 is the V-type engine including the front bank BF and the rear bank BR, and the front outer cover 6 and the rear outer cover 7 are provided separately for these banks, respectively. Therefore, in a case where maintenance of only one bank side is required, it is possible to cope with the case by removing only the outer cover 6 or 7 of the bank, and as a result, it is possible to further reduce the man-hours and time of the maintenance work.

Note that the present invention is not limited to the embodiment that has been described, and can be implemented in various aspects. For example, in the embodiment, the accommodating groove is provided on the cylinder head CH side out of the respective mating surfaces of the rear outer cover 7 and the cylinder head CH to accommodate the first packing 31 therein, but the accommodating groove may be provided on the rear outer cover 7 side.

Further, the cooling water pipe is given as an example of a predetermined other component that needs to avoid interference when the rear outer cover 7 is inserted in the embodiment, but the present invention is not limited thereto, and components other than the cooling water pipe that the rear outer cover 7 is likely to interfere with may be applied.

Furthermore, the timing belt TB is used as the transmission band for drive transmission from the crankshaft 10 to the camshaft 11 to 14 in the embodiment, but the present invention is not limited thereto. For example, as an example of a transmission structure of the internal combustion engine 1, a chain transmission mechanism configured by stretching a transmission band including a timing chain over a crankshaft drive wheel including a sprocket and a camshaft driven wheel may be used. In addition, the detailed configuration can be changed as appropriate within the scope of the gist of the present invention.

REFERENCE SIGNS LIST 1 internal combustion engine
2 front inner cover (inner cover member)
3 rear inner cover (inner cover member)
4 upper outer cover (outer cover member)
5 lower outer cover (outer cover member)
6 front outer cover (outer cover member)
7 rear outer cover (outer cover member)

8 side mount bracket (outer cover member)
9 lower cover (outer cover member)
10 crankshaft
11 to 14 camshaft
30 guide portion
31 first packing
32 accommodating groove
33 second packing
34 protrusion
CB cylinder block (internal combustion engine body)
CH cylinder head (internal combustion engine body and inner cover member)
TB timing belt
OP oil pump case (inner cover member)
BF front bank
BR rear bank

The invention claimed is:

1. A seal structure of a belt cover for an internal combustion engine, which includes a timing belt disposed on one end side of an internal combustion engine body in a direction of a cylinder bore row and drivingly coupling a crankshaft and a camshaft, and a predetermined other component disposed on the one end side of the internal combustion engine body, the seal structure of the belt cover accommodating the timing belt in a liquid-tight state, the seal structure comprising:
   an inner cover member disposed on a side of the internal combustion engine body with respect to the timing belt; and
   an outer cover member that is disposed on an opposite side of the internal combustion engine body with respect to the timing belt and accommodates the timing belt in the liquid-tight state together with the inner cover member,
   wherein the outer cover member is divided into at least an upper outer cover and a lower outer cover in a cylinder axis direction,
   the upper outer cover and the inner cover member have mating surfaces to be mated with each other in outer peripheral portions, respectively, and sealing in the direction of the cylinder bore row is formed by a first seal member accommodated in an accommodating groove formed in one of the mating surfaces,
   the upper outer cover and the lower outer cover have an upper mating surface and a lower mating surface to be mated with each other in a lower end portion and an upper end portion, respectively, and sealing in the cylinder axis direction is formed by a second seal member accommodated in an accommodating groove formed in the lower mating surface,
   a predetermined gap through which the upper outer cover passes is formed between the inner cover member and the other component, and
   the lower mating surface of the lower outer cover is provided with a plurality of protrusions spaced apart from each other to lock the upper outer cover inserted from above.

2. The seal structure of the belt cover for the internal combustion engine according to claim 1, wherein a guide portion is formed on the mating surfaces between the upper outer cover and the inner cover member, the guide portion being inclined to approach a side of the other component from a position facing the other component as proceeding toward the lower mating surface side of the lower outer cover.

3. The seal structure of the belt cover for the internal combustion engine according to claim 1, wherein the predetermined other component includes a pipe through which a liquid for the internal combustion engine flows.

4. The seal structure of the belt cover for the internal combustion engine according to claim 1 or 2, wherein
   the internal combustion engine is a V-type engine including a plurality of banks respectively having a plurality of the cylinder bore rows, and
   the upper outer cover is divided into a plurality of upper outer covers for the plurality of banks, respectively.

5. A mounting method of a belt cover for an internal combustion engine for mounting the belt cover according to claim 1, the mounting method comprising:
   inserting the upper outer cover between the other component and the inner cover member from above and moving the upper outer cover downward along the mating surfaces; and
   mating the upper mating surface of the upper outer cover with the lower mating surface of the lower outer cover to compress the second seal member, and fastening and fixing the upper outer cover to the internal combustion engine body in a state where the mating surface of the upper outer cover compresses the first seal member.

* * * * *